United States Patent [19]
St. Laurent et al.

[11] Patent Number: 5,830,938
[45] Date of Patent: Nov. 3, 1998

[54] WATER-REDUCIBLE COATING

[75] Inventors: Dennis St. Laurent, Feeding Hills; Earl Spice, Granby, both of Mass.

[73] Assignee: Morton International, Inc., Chicago, Ill.

[21] Appl. No.: 868,412

[22] Filed: Jun. 3, 1997

[51] Int. Cl.[6] .................................................. C08K 5/101
[52] U.S. Cl. ............................................ 524/317; 524/590
[58] Field of Search .................................... 524/316, 590, 524/317

[56] References Cited

U.S. PATENT DOCUMENTS

| | | | |
|---|---|---|---|
| 5,202,377 | 4/1993 | Thorne | 528/49 |
| 5,369,208 | 11/1994 | Stuber | 528/53 |
| 5,391,614 | 2/1995 | Chandalia | 528/49 |
| 5,461,109 | 10/1995 | Blair et al. | 524/839 |
| 5,496,642 | 3/1996 | Martinez | 528/45 |
| 5,506,328 | 4/1996 | Chandalia | 524/315 |

*Primary Examiner*—Paul R. Michl
*Attorney, Agent, or Firm*—Wayne E. Nacker; Gerald K. White

[57] ABSTRACT

The invention provides a two-part polyurethane coating suitable, for example, for coating a golf ball. The first part comprises a A) water-reducible polyol and the second part comprises B) a water dispersible, aliphatic polyisocyanate. The NCO/OH ratio of B):A) is between about 1.5:1 to about 2.5:1. The two-part composition also includes C) an organic solvent component at between about 5 and about 50 parts per hundred by weight based on total weight of A) plus B). At least about 50 wt %, up to 100% of the solvent C) comprises ethyl 3-ethoxy propionate.

1 Claim, No Drawings

WATER-REDUCIBLE COATING

BACKGROUND OF THE INVENTION

The present invention relates to a two-part polyurethane coating.

While the coating of the invention has a variety of uses, the improvement of the present invention has particular applicability as a coating for golf balls. The invention is particularly directed to a waterborne, two-part polyurethane coating of the type described in U.S. Pat. No. 5,461,109 to Blair et al., the teachings of which are incorporated herein by reference. Golf balls are often coated with an outermost protective polyurethane clear coating. Such coatings are applied to spinning golf balls, and a defect-free, aesthetically pleasing coating is particularly necessary when coating golf balls.

Two component water-based polyurethane systems are typically formed from a first component of polyol and water and a polyisocyanate second component. Upon addition of the components to one another and evaporation of water and other solvents from the system, a polymeric urethane coating is formed. Although such two component water-based systems are preferable in many respects to traditional non-aqueous solvent-based systems and one component water-based systems, there are numerous problems in attempting to form a two component, water-based polyurethane top coat on a golf ball.

One problem encountered in forming a polyurethane coating form a two component water-based polyurethane system from a two component water-based polyurethane system is that the polyisocyanate readily reacts with water, either in the other component or in the surrounding environment, thereby generating carbon dioxide gas which tends to foam the coating. The resulting foamy appearance and rough surface is undesirable and is often accompanied by poor coating properties. Such coatings are unacceptable for use on golf balls. Thus, there is a need for a two component water-based polyurethane golf ball coating which avoids the formation of carbon dioxide or other gaseous agent(s) during formation and application of the coating, and which produces a clear, protective, aesthetically pleasing golf ball top coat.

In addition, it is necessary that any outer coating applied to a golf ball not destroy or significantly alter the particular surface configuration of the golf ball. An outer coating which destroys or significantly alters the surface configuration of a golf ball generally adversely affects the aerodynamics of the ball. Coating compositions which have a relatively high viscosity tend to form coatings having varying thicknesses especially when such coatings are applied onto special irregular surfaces such as that formed into a golf ball. Thus, prior to application of a coating composition to a golf ball, it may is often necessary to adjust the viscosity of the composition by addition of an organic solvent. However, it is undesirable to utilize high levels of non-aqueous organic solvents in view of their cost, health hazards, toxicity and flammability. In water-based systems, the addition of water promotes time generation of carbon dioxide to produce a foamy coating. Thus, there is a need for a golf ball coating having a viscosity which may be readily adjusted by the addition of water while avoiding foaming.

SUMMARY OF THE INVENTION

In a two-part polyurethane coating in which the first part comprises a A) water-reducible polyol and the second part comprises B) a water dispersible, aliphatic polyisocyanate, the NCO/OH ratio of B):A) being between about 1.5:1 to about 2.5:1, preferably between about 1.8:1 and about 2:1, and C) an organic solvent component at between about 5 and about 50, preferably between about 8 and about 20, parts per hundred by weight based on total weight (on a solids basis) of A) plus B), the improvement wherein at least about 50 wt %, up to 100% of the solvent C) comprises ethyl 3-ethoxy propionate (EEP), CAS No. 763-69-9.

DETAILED DESCRIPTION OF CERTAIN PREFERRED EMBODIMENTS

The present invention relates to coatings, particularly coatings suitable for coating golf balls. In addition, the present invention relates to a substrate, such as a golf ball, having a coating formed from such compositions and methods of forming such coating. The coating composition of the present invention is a water-reducible urethane system, comprising two components which are kept separate from one another until the desired time for forming the coating of the present invention. The term "water reducible" as used herein refers to the ability to decrease the viscosity of the coating by adding water to the mixture after combining the first and second components to one another, or by adding water to the first component containing the hydroxyl functional agent as described below. The substantially non-foaming coating is formed by the addition and subsequent reaction of a first component and a second component as follows.

The first component comprises at least one polyol compound having hydroxyl functionality such as a polyurethane polyol, a polyether polyol, a polyester polyol, a polyether/polyester polyol, etc. In addition, the first component may contain a minor amount of an optional organic solvent. Other optional ingredients of the first component include, but are not limited to a fluroaliphatic polymeric ester, a polysiloxane copolymer, a water soluble optical brightener, and water. The polyol providing the hydroxyl functionality may be an organic compound having multiple —OH groups including but not limited to alcohols (dihydric, trihydric or polyhydric), acrylics, polyesters, vinyls and alkyds or combinations thereof. The term "polyol" as used herein refers to any organic compound having two or more hydroxyl groups. The polyol functions as the primary reactant with the polyisocyanate in the second component. The polyol provides resin solids in the first component and enhances the flexibility, toughness and resistance properties of the resulting coating. Suitable polyurethane polyols, polyether polyols and polyester polyols are commercially available and are designated by the weight percent solids in the resin product and the hydroxyl equivalent weight of the compound. The hydroxyl equivalent weight provides a measure of the length of each repeating monomer unit in the resin formulation. A hydroxyl equivalent weight of 2000 for instance indicates that the average molecular weight between hydroxyl groups is 2000 (or that average molecular weight of a repeating unit having hydroxyl group is 2000). The most preferred polyol have a hydroxyl equivalent weights of about 1500 to about 4000. A suitable polyurethane polyol is Polyurethane Polyol BAYHYDROL XP 7044 from Bayer Chemicals of Pittsburgh, Pa. A suitable polyester polyol, also sold by Bayer, is BAHYDROL XP 7093. Examples of other suitable polyols, used either alone or in admixture with other polyols, include ACRYLOID WR-97, a water-reducible acrylic from Rohm & Haas of Philadelphia, Pa.; ROSHIELD 3275, a water-reducible acrylic from Rohm & Haas of Philadelphia, Pa.; K-FLEX 320W, a polyurethane from King Industries of Stanford, Conn.; UCAR BW875, a water-reducible vinyl polyol, available from Union Carbide; CARGILL 72-7289, a water-reducible polyester polyol form Cargill of Minneapolis, Minn.; and BAYHYDROL XP-7056, a water-reducible aliphatic polyester polyol from Bayer Chemicals.

It is optional to utilize the organic solvent in the first component. If one is employed, EEP may comprise all or part of the solvent in the first component. However, as most of the organic solvent employed is typically added to the second (polyisocyanate-containing) component for viscosity adjustment, it is not necessary that any organic solvent portion of the first component be EEP. Other suitable organic solvents useful in the first component include as methyl pyrolidone, alcohols such as butyl CELLOSOLVE, which is 2-butoxy-ethanol, available from Union Carbide, Also, any of the solvents that may be utilized in the second component in conjunction with EEP described more fully below are suitable for use in the first component.

A polysiloxane copolymer may optionally be utilized to improve the mar and slip resistance characteristics of the resulting coating. A suitable polysiloxane copolymer is a polyester modified dimethyl-polysiloxane copolymer. Examples of such copolymer include BYK 300 series, available from BYK-Chemie of Wallingford, Conn.

A suitable UV absorber is sold as Tintuvin® 1130 by Ciba-Geigy.

The second component comprises a water dispersible aliphatic polyisocyanate and an organic solvent. The aliphatic polyisocyanate is a co-reactant of the compound having hydroxyl functionality in the first component, so that upon polymerization, they produce the cross-linked matrix structure of the resulting coating. In addition, the aliphatic polyisocyanate provides the coating with its non-yellowing characteristics. Examples of the aliphatic polyisocyanate include, but are not limited to, linear, branched, or alicyclic hydrocarbons. Representative examples of such hydrocarbons include, but are not limited to, ethylene diisocyanate, trimethylene diisocyanate, tetramethylene diisocyanate, hexamethylene diisocyanate, dodecamethylene diisocyanate, trimethyl hexamethylene diisocyanate, cyclobutane diisocyanate, cyclohexane diisocyanate, and isophorone diisocyanate. Other suitable aliphatic polyisocyanates include BAYHYDUR XP 7043 and XP 7093, both available from Bayer.

Organic solvent is employed to reduce viscosity and thereby improve the application properties of the second component and resulting coating. Organic solvent is used herein at between about 5 and about 25 phr, preferably between about 8 and about 15 phr, of the total resin system, including the polyol and the isocyanate (on a resin solids basis). In the second component, organic solvent is typically employed at between about 10 and about 50 wt % relative to the polyisocyanate. Herein, it is found that coating is improved when at least about 50 wt % of the total solvent of the system, including both the first component and the second component, is EEP. EEP is found to be a superior solvent for lowering viscosity, particularly of the second component, thereby enhancing flow characteristics. EEP is believed to facilitate emulsification of the polyisocyanate when the two components are admixed.

The coating of the present invention is made by adding the second component to the first component while mixing. A typical weight ratio of the first component to the second component is about 100 parts to about 35 parts.

The viscosity of the coating composition is adjustable by appropriate additions of water, either before and/or after the two parts are mixed.

Various other acrylic, water-based epoxies, and epoxy functional resins may be blended or reacted with the two component system described herein to improve coating quality and enhance performance characteristics. Moreover, it is envisioned that various agents and additives such as, but not limited to, defoamers, curing catalysts, fillers, dyes, placticizers, waxes, and U.V. stabilizers, may be added to modify the properties of the resulting coating. In addition, an optical brightener such as UVITEX® OB, may be added preferably in a concentration between about 0.01% and about 0.25%, preferably between about 0.05 and about 0.15%, based upon the total dry weight of the polyol plus the polyisocyanate.

In addition to forming a clear top coat, such as a golf ball top coat, the present invention may also be used to provide a pigmented coating. Pigment may be added up to about 100 phr, based upon total weight of the polyol and polyisocyanate.

The formation of the polyurethane top coat of the present invention upon a golf ball is as follows. After preparing the first and second components as described herein, and after adding the components to one another in the desired proportions, the resulting mixture is applied onto the outer surface of a golf ball. The golf ball may be any type of golf ball having an outer layer formed from an assortment of materials including, but not limited to, SURLYN®, urethane, balata or generally any polymeric material. The golf ball may be unprimed, or may have a primer coating thereon. The uncured or partially cured coating mixture of the present invention may be applied to the golf ball in a variety of fashions including spraying, dipping, pouring, brushing and wiping. It is preferred to apply the mixture by spraying onto the golf ball surface. Coating thicknesses may be varied by adjusting the viscosity of the uncured coating mixture, environmental conditions (e.g. temperature), rate of application, rate of curing or polymerization of the coating upon application to the golf ball, and use of multiple coats. For single application, the present inventors have found that the preferred amount or thickness of the uncured coating mixture after application to the golf ball is from about 100 to about 250 milligrams per ball. Such values are typically referred to in the industry as the "wet film weight." Upon curing and/or drying, the "dry film weight" is generally from about 60 to about 150 milligrams per ball. If a plurality of thin layers are applied to form he golf ball top coat, it is preferred to adjust the thickness of each layer so that the total amount of coating applied in the plurality of layers is within the aforementioned range.

Curing of the coating after deposition to the golf ball occurs by polymerization between the polyol in the first component and the aliphatic polyisocyanate in the second component. Such curing may be performed at ambient temperature. As previously noted, it is believed that in-situ polymerization of the coating occurs after application to he golf ball and results in a superior coating as opposed to "one pack" systems. Polymerization is allowed to proceed until equilibrium of the system is reached and the coating is dried to remove the water and organic solvents from the system. Heat may be employed to accelerate both the polymerization and drying phases of the curing operations.

The golf ball top coat formulation described herein does not require such a primer coat or adhesion promoting layer prior to application to a SURLYN® golf ball as the top coat formulation of the present invention bonds to the SURLYN® material with sufficient strength to avoid flaking off or cracking when subjected to stress or aging. However, better adhesion is achieved using a primer coating, such as Morton International, Inc.'s 391 C 3 clear primer (a one-pack urethane emulsion primer coating).

The invention will now be described in greater detail by way of specific examples.

EXAMPLE 1 AND COMPARATIVE EXAMPLES 2 AND 3

Two-part coatings were formulated as follows:

Part I:

| Material | Parts by weight |
|---|---|
| Bayhydrol ® XP 7093 | 460.18 |
| Tinuvin ® 1130 | 8.88 |
| BYK ® 345 | 2.06 |
| Deionized water | 188.17 |

Part B:

| Material | Parts by weight |
|---|---|
| Bayhydur ® XP-7063 | 78.29 |
| Solvent* | 13.05 |
| UVITEX OB | 0.12 |

*Example 1, EEP; Example 2, EXXATE 600; Example 3, Butyl cellosolve

SURLYN® covered golf balls were coated with a primer layer of Morton International 391 C 3 clear primer. The two parts of the coatings were mixed, and the primer-coated golf balls were then coated with the mixture in an amount which provided a wet film weight of 400 milligrams per ball. The coated golf balls are allowed to dry and cure at ambient temperature. Coating results were as follows:

|  | EXAMPLE 1 | EXAMPLE 2* | EXAMPLE 3* |
|---|---|---|---|
| Viscosity Zahn #4 @ 77° F. | 25" | 27" | 28" |
| Gloss 60° | 95+ | 90–92 | 90–92 |
| Depth Of Image | Excellent | Slightly Fuzzy | Slightly Fuzzy |
| Flow 1–5 | 1 | 3 | 4 |
| 1 = Best | Very smooth | Orange peels | Orange peels |

*Slows down drytime compare to EEP trial and Butyl Cellosolve (Ex. 3) causes potlife to be shortened.

What is claimed is:

1. A two-part polyurethane coating in which the first part comprises a A) water-reducible polyol and water, and the second part comprises B) a water dispersible, aliphatic, primary polyisocyanate, the NCO/OH ratio of B):A) being between about 1.5:1 to about 2.5:1, and C) an organic solvent component at between about 5 and about 50 parts per hundred by weight based on total weight of A) plus B), the improvement wherein at least about 50 wt %, up to 100% of the solvent C) comprises ethyl 3-ethoxy propionate.

* * * * *